(12) United States Patent
Cabral et al.

(10) Patent No.: US 9,180,559 B2
(45) Date of Patent: Nov. 10, 2015

(54) APPARATUS AND METHOD FOR MEASURING BEARING DIMENSION

(71) Applicant: NSK Americas, Inc., Ann Arbor, MI (US)

(72) Inventors: Jose Cabral, Greenwood, IN (US); John Clark, Greenwood, IN (US); Takeshi Aiba, Greenwood, IN (US)

(73) Assignee: NSK Americas, Inc., Ann Arbor, MI (US)

( * ) Notice: Subject to any disclaimer, the term of this patent is extended or adjusted under 35 U.S.C. 154(b) by 168 days.

(21) Appl. No.: 13/951,919

(22) Filed: Jul. 26, 2013

(65) Prior Publication Data

US 2014/0047716 A1 Feb. 20, 2014

Related U.S. Application Data

(60) Provisional application No. 61/683,967, filed on Aug. 16, 2012.

(51) Int. Cl.
| | |
|---|---|
| *B21D 53/10* | (2006.01) |
| *B23P 17/00* | (2006.01) |
| *B29D 33/00* | (2010.01) |
| *B23P 15/00* | (2006.01) |
| *G01B 5/02* | (2006.01) |
| *B24B 19/06* | (2006.01) |
| *F16C 33/14* | (2006.01) |

(52) U.S. Cl.
CPC ............. *B23P 15/003* (2013.01); *G01B 5/02* (2013.01); *B24B 19/06* (2013.01); *F16C 33/14* (2013.01); *Y10T 29/49636* (2015.01); *Y10T 29/49668* (2015.01)

(58) Field of Classification Search
CPC ........... F16C 33/14; B21D 53/10; B24B 5/04; B24B 5/06; B24B 5/10; B24B 5/12; B24B 5/33; B24B 5/307; B24B 41/005; B24B 19/06; B23P 15/003; Y10T 29/49764; Y10T 29/49771; Y10T 29/49778; Y10T 29/49636; Y10T 29/49668; Y10T 29/49671; Y10T 29/496; Y10T 29/46689; Y10T 29/49643; Y10T 29/49567; Y10T 29/49684; Y10T 29/53104; Y10T 29/49995; Y10T 29/49996
See application file for complete search history.

(56) References Cited

U.S. PATENT DOCUMENTS

| | | | | |
|---|---|---|---|---|
| 3,634,976 | A * | 1/1972 | Hahn et al. | ........................ 451/5 |
| 4,061,952 | A * | 12/1977 | Dinsdale et al. | ............... 318/572 |
| 4,170,851 | A | 10/1979 | Enos | |

(Continued)

FOREIGN PATENT DOCUMENTS

| | | | | |
|---|---|---|---|---|
| DE | 10054509 | A1 * | 5/2002 | ............. B23Q 17/20 |
| EP | 0356663 | B1 | 3/1990 | |

*Primary Examiner* — Essama Omgba
(74) *Attorney, Agent, or Firm* — The Dobrusin Law Firm, P.C.

(57) ABSTRACT

A method comprising: (a). providing a device comprising: a movable table having a movement gage; a gage for measuring a dimension of one or more bearing blanks; and a machining tool for machining the one or more bearing blanks; (b). prompting a user to input one or more process variables; (c). supplying the one or more bearing blank into the device; (d). moving the bearing blank to a table grinding position; and (e). measuring the dimension of the one or more bearing blanks using the gage; (f). measuring a distance moved by the movable table so that a reference measurement is provided; and (g). comparing the measurement of step (e) to the reference measurement of step (f).

20 Claims, 5 Drawing Sheets

(56) References Cited

U.S. PATENT DOCUMENTS

| | | | |
|---|---|---|---|
| 4,193,227 A * | 3/1980 | Uhtenwoldt | 451/5 |
| 4,363,196 A * | 12/1982 | Uhtenwoldt | 451/5 |
| 4,498,259 A * | 2/1985 | Yamamoto et al. | 451/5 |
| 4,567,695 A * | 2/1986 | Schaeffler | 451/52 |
| 4,811,524 A * | 3/1989 | Corallo | 451/9 |
| 5,025,594 A * | 6/1991 | Lambert et al. | 451/27 |
| 5,042,206 A * | 8/1991 | Lambert et al. | 451/11 |
| 5,044,125 A * | 9/1991 | Lambert et al. | 451/27 |
| 5,070,655 A * | 12/1991 | Aggarwal | 451/5 |
| 5,173,863 A * | 12/1992 | Martin | 700/164 |
| 5,271,187 A * | 12/1993 | Yoneda et al. | 451/21 |
| 5,539,814 A | 7/1996 | Shoji | |
| 5,681,209 A * | 10/1997 | Naumann et al. | 451/51 |
| 5,718,617 A * | 2/1998 | Priestley et al. | 451/14 |
| 6,098,452 A * | 8/2000 | Enomoto | 73/104 |
| 6,205,371 B1 * | 3/2001 | Wolter-Doll | 700/174 |
| 6,332,265 B1 | 12/2001 | Tonooka | |
| 6,616,508 B1 * | 9/2003 | Kamamura et al. | 451/8 |
| 6,905,393 B2 * | 6/2005 | Goransson | 451/5 |
| 6,926,586 B2 * | 8/2005 | Han | 451/8 |
| 7,151,977 B2 * | 12/2006 | Laquerbe | 700/174 |
| 7,246,023 B2 * | 7/2007 | Bhateja et al. | 702/104 |
| 7,376,482 B2 * | 5/2008 | Ido | 700/164 |
| 7,457,715 B1 * | 11/2008 | Bhateja et al. | 702/106 |
| 7,645,180 B2 * | 1/2010 | DiNardi | 451/5 |
| 7,756,684 B2 * | 7/2010 | Bhateja et al. | 702/189 |
| 7,882,638 B2 * | 2/2011 | von Gynz-Rekowski | 29/898.054 |
| 2004/0133299 A1 * | 7/2004 | Goransson | 700/176 |
| 2006/0283017 A1 | 12/2006 | von Gynz-Rekowski | |
| 2010/0323590 A1 | 12/2010 | Passoni | |

* cited by examiner

APPARATUS AND METHOD FOR MEASURING BEARING DIMENSION

FIELD

The present teachings relate to a device and method for measuring bearings and specifically a device and method for measuring an inner diameter, an outer diameter, or both of a bearing.

BACKGROUND

Typically, bearing components undergo a series of grinding stages. Each grinding stage removes material from the components so that a final component can be constructed. Each of the bearing components have strict tolerances that need to be maintained so that the resulting bearing provides a low vibration rotational assembly. Before and/or during one or more of the grinding stages, each of the bearing components are measured to determine the dimensions of each of the bearings. If the bearing components fall outside of the specifications the components are rejected and/or reworked. The measurement tools that are used for the measurement of each of the bearing components may malfunction, be damaged, gradually lose calibration, or a combination thereof, thus, causing bearing components that are outside of the specifications to experience downstream grinding stages which may result in additional work, additional scrap, rejected parts, or a combination thereof. Examples of measurement and grinding systems may be found in U.S. patent application Ser. Nos. 4,070,851; 5,359,814; and 6,332,265; U.S. Patent Application Publication Nos. 2006/0283017 and 2010/032590; and European Patent No. EP0356663B1 all of which are incorporated by reference herein for all purposes. Currently, movement of a grinding table is measured and compared to the measurements of a grinding gage during the initial stages of grinding so that the calibration of the gage is checked during the initial grinding stage. The current systems provide excellent results in verifying the system is in alignment; however, the current systems do not provide for adjustment of the system from part to part or adjustment of process variables so that calibration is adjusted form part to part and scrap is further reduced, tighter tolerances from part to part may be maintained, or both. The current system unexpectedly solves this problem by performing the process of the teachings herein.

Another difficulty experienced by current systems is determining the dimensions of a machine tool subsequent to machining each bearing blank. This challenge results in discarding some machining tools before they are fully worn, keeping machining tools in operation that are fully worn, using damaged machining tool, damaging the machining tools in a system that is not working properly, or a combination thereof. For example, if a circumference of the machining tool wears faster or slower than calculated and/or expected the machining of the bearing blank may be affected.

It would be attractive to have a system that has a high degree of reliability in measuring each bearing during one or more of the grinding stages and allows for adjustment of one or more process variables from part to part. It would be attractive to have a system that is not susceptible to malfunction, damage, and will not lose calibration. What is needed is a system that measures each component during each grinding stage so that out of tolerance parts may be reworked and/or the machine may be recalibrated before parts are rejected. What is needed is a system that accurately monitors the life of the machining tool so that the machining tool is taken out of operation when the useful life is removed, before out of specification bearing blanks are created, before the device is damaged, or a combination thereof.

SUMMARY OF THE INVENTION

The present teachings addresses one or more of the above needs by providing a system and method of measuring one or more dimensions of one or more bearing parts (i.e., bearing blanks). The system measures one or more bearing dimensions while simultaneously measuring one or more other system components, and comparing the measurements to each other so that the dimensions of the bearing blanks remain within specification, the system may be recalibrated, or both.

In another aspect, the present invention contemplates a method comprising: (a). providing a device comprising: a movable table having a movement gage; a gage for measuring a dimension of one or more bearing blanks; and a machining tool for machining the one or more bearing blanks; (b). prompting a user to input one or more process variables; (c). supplying the one or more bearing blank into the device; (d). moving the bearing blank to a table grinding position; and (e). measuring the dimension of the one or more bearing blanks using the gage; (f). measuring a distance moved by the movable table so that a reference measurement is provided; and (g). comparing the measurement of step (e) to the reference measurement of step (f).

Another embodiment of the present teachings includes: a method comprising: (a) providing a device comprising: (1) a movable table having a movement gage; (2) a gage for measuring a dimension of one or more bearing blanks; and (3) a machining tool for machining the one or more bearing blanks; (b) supplying the one or more bearing blank into the device; (c) moving the bearing blank to a table grinding position; (d) machining the one or more bearing blanks with the machining tool; (e) estimating and/or calculating a volume removed from the machining tool during the step of machining; (f) measuring a distance moved by the movable table so that a reference measurement is provided; (g) measuring a change in the dimension of the one or more bearing blanks using the gage; and (h) subtracting the distance moved by the movable table in step (f) from the change in the dimension of the one or more bearing blanks; and (i) comparing a quotient of step (h) to the volume of step (e) so that the volume removed from the machining tool is monitored during machining.

The present teachings provide a system that has a high degree of reliability in measuring each bearing during one or more of the grinding stages and allows for adjustment of one or more process variables from part to part. The present teachings provide a system that has a low susceptibility or is not susceptible to malfunction, damage, and will not lose calibration. The present teachings provide a system and method that measures each component during each grinding stage so that out of tolerance parts may be reworked and/or the machine may be recalibrated before parts are rejected. The present teachings accurately monitor the life of the machining tool so that the machining tool is taken out of operation when the useful life is removed, before out of specification bearing blanks are created, before the device is damaged, or a combination thereof.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Generally, a bearing is comprised of an inner ring (i.e., inner race), an outer ring (i.e., inner race), a cage, and a plurality of roller elements held by the cage. Both the cage and plurality of roller elements are disposed between the inner ring and the outer ring. A bearing may include one or more seals between the inner ring and the outer ring for retaining a lubricant. The inner ring, the outer ring, the cage, or a combination thereof may be a bearing blank that is formed and machined into each respective part. The bearing blanks include an inner surface, an outer surface, and two opposing faces. The inner surface, the outer surface, two opposing faces, or a combination thereof may have any shape and size so that a plurality of roller elements may be located between the inner ring and the outer ring to create a low friction moving surface. The inner surface, the outer surface, or both may be planar, contoured, include a groove, be generally "C" shaped, be generally "U" shaped, or a combination thereof. The inner surface, the outer surface, the two opposing faces, or a combination thereof of the bearing blanks may be machined so that the desired shape and surface characteristics may be created in the bearing blanks. Machining of the bearing blanks may be performed in one or more stages until a final product is created.

The bearing blanks may be fed into a device as discussed herein. The device includes a movable table having a positioning gage, a gage for measuring one or more dimensions of a bearing blank, and a machining tool. The device may include one or more computers, one or more user interfaces, one or more monitoring screens, or a combination thereof. Preferably, the computer monitors the positioning gage and the gage for measuring the one or more dimensions of the bearing blanks. The computer may include one or more non transitory storage mediums being loaded with one or more programs. The non transitory storage medium may be used in conjunction the one or more programs to facilitate one or more of the process steps discussed herein. The computer may include one or more non transitory programs for monitoring the dimensions of the one or more bearing blanks as the one or more bearing blanks in one or more of the grinding stages discussed herein.

The non transitory program may perform a step of comparing measurements of the one or more gages. The non transitory program may include a step of prompting a user for inputting one or more process variables. The non transitory program in a step of comparing may: stop grinding, request that the device be recalibrated, reject a bearing blank, adjusting the grinding operation, or a combination thereof. The non transitory program may calibrate the gages based upon the dimension of the bearing blank being measured. For example, the non transitory program may perform one measurement when the inner diameter of the bearing blank is measured and another measurement when the outer diameter is measured. The non transitory program may continually monitor, intermittently monitor, monitor one time, or a combination thereof a machining step.

Machining may be any method that removes material from a ring to form a desired shape, size, configuration, or a combination thereof. Machining may be performed by any machining tool that assists in creating a final piece. A machining tool may be a grinder, sander, polisher, a rotating cutting tool (e.g., a lathe), the like, or a combination thereof, so that the part has the desired size and shape. Machining may be performed in one or more steps so that a final part is created. Preferably, machining may be performed in two or more stages so that a predetermined tolerance may be achieved. More preferably, machining may be performed in three stages. A stage may be movement of the bearing blank from a first station to a second station. Preferably, a stage is an adjustment in grinding speed, abrasive material used to grind, or both. Before, during, after, or a combination thereof the step of machining the dimensions of the machining tool may be estimated, calculated, measured, or a combination thereof. The device may estimate and/or calculated one or more dimensions of the machining tool (e.g., circumference, diameter, radius, length, width, height, or a combination thereof). The machining tool may include a gage to measure the amount of material removed from the machining tool after each grinding stage, event, cycle, or a combination thereof. However, the machining tool may be free of a gage. The movement of the machining tool in the horizontal direction may not be measured since the machining tool is free of lateral movement and, thus, the gage may not measure the dimensions of the machining tool. The non transitory program may calculate and/or estimate the amount of material removed from the machining tool during each grinding stage.

Machining may be performed by any device that receives one or more parts in series, processes each part, and transports each part to another location. The device may require manual interaction. Preferably, the device is automated. The device includes a machining tool, a movable table, and a gage. The device may include one or more input conveyors, one or more output conveyors, a gantry loader, a robotic arm, a hydraulic loader, or a combination thereof.

The movable table maybe any table that moves in and/or along one or more axes of rotation. Preferably, the table moves in and/or along at least two axes of rotation. The movable table may move in the X-direction, the Y-direction, the Z-direction, rotate around one or more of the axes formed along those directions, or a combination thereof. Preferably, the table moves in the Y-direction (i.e., Horizontal). For example, during operation the movable table may move forward or backwards to accept a bearing blank and then in an opposing direction so that the bearing blank can be machined. The table may open so that a bearing blank may be moved into the movable table so that the bearing blank may be held and machined. For example, the table may be comprised of more than one piece and the pieces may separate to receive a bearing blank and once the bearing blank is in contact with the pieces of the table, the table and bearing blank may move in unison so that the bearing blank may be machined. The movement of the movable table may be monitored so that the distance traveled from a starting position, a machining position, a reference position, or a combination thereof may be measured. The table may be moved until the machining tool contacts the bearing blank and then the table movement may be monitored. Once the movable table reaches a machining position the machining tool may be moved into contact with a surface of the bearing blank so that the machining tool may machine the surface of the bearing blank. The table, the machining tool, or both may include a measuring device so that the position of the movable table, the machining tool, or both may be measured before, during, or after machining of each bearing blank. The dimensions of the bearing blank may be measured by a gage before, during, after, or a combination thereof machining.

The gages discussed herein (e.g., the gage and the table measuring device) may be any measurement device that measures a distance between two points, a thickness, a width, or a combination thereof. The gages (i.e., measurement devices) discussed herein may be any contact gage, non-contact gage, or both useful in measuring bearing blanks. Examples of contact measurement devices that may be used are a caliper, gauge block, tape measure, ruler, a gage, linear counter, or a combination thereof. The distance may be measured by a non-contact measuring device. Examples of non-contact measurement devices that may be used are a laser, ultrasonic measuring device, infrared measuring device, or a combination thereof. Preferably, the gage used to measure the bearing blank includes at least two contact devices that contact opposing sides of a bearing blank surface so that the distance therebetween may be measured. A gage may be moved into a measuring position. The gage may be moved into the measuring position based upon a reference measurement. For example, the gage may be free of measurement until a predetermined amount of grinding has been performed and once the predetermined amount of grinding has been performed, based upon the reference measurement, the gage may be moved into the measuring position. The predetermined amount of grinding before the gage is moved into the measuring position may be any amount so that the contact gages life span is increased. The predetermined amount may be when about 50 percent or more, about 60 percent or more, about 70 percent or more, or about 80 percent or more of the grinding has been completed based upon the reference measurement before the grinding wheel is moved into contact with the bearing blank. The predetermined amount may be when about 95 percent or less, 90 percent or less, or about 85 percent or less of the grinding has been completed based upon the reference measurement before the grinding wheel is moved into contact with the bearing blank. A gage is moved into contact with one or more surfaces of the bearing blank before, during, or after the machining tool is moved into contact with the bearing blank. The gage may measure the dimensions (e.g., inner diameter, outer diameter, width, thickness, or a combination thereof) of the bearing blank so that the dimensions of the bearing blank may be determined before machining, during machining, after machining, between stages, or a combination thereof. Preferably, the gage includes at least two parts and the gage measures the distance between the two parts to determine the dimensions of a bearing blank. The measurements of the gage may be compared to a reference measurement.

The reference measurement may be any measurement taken by a device other than the gage. For example, the reference measurement may be a measurement of the table position (i.e., table measurement). The reference measurement may be the distance the movable table moves during machining. For example, the machining tool may be horizontally static and the movable table may move the bearing blank horizontally into contact with the bearing blank so that the machining tool may machine the bearing blank, and when the machining tool is in contact with the bearing blank the gage on the movable table may provide a reference measurement versus a standard starting point, a rolling average starting point, or both of the movable table. The reference measurement may be determined by monitoring the travel distance of the movable table. For example, the movable table may have a standard bottom stop so that bearing blanks may be placed on the movable table and the movable table may travel towards the machining tool until the bearing blank is a standard distance from the machining tool. The distance traveled may be compared to a standard travel distance and if the distance is less than or exceeds a predetermined travel distance the part may be rejected, flagged, the operation may cease, or a combination thereof. The reference measurement may be continuously compared to the gage measurement so that the gage measurement is continuously checked for calibration. Preferably, the gage measurement may be compared to an average reference measurement. The average number of reference measurements compared to the gage measurements may be a predetermined number. The average number of reference measurements may be 5 or more, 10 or more, 15 or more, or 20 or more. The average number of reference measurements may be 100 or less, 75 or less, 60 or less, or about 50 or less. Preferably, the average number of reference measurements compared to the gage measurements may be a user selected variable. For example, the device, the non transitory program, or both may prompt a user to enter the number of reference measurements to be compared when the device is set up for each style of bearing blank.

The distance traveled by the movable table may be subtracted from the distance measured by the gage creating a quotient. For example, the gage measures the amount of material removed from the bearing blank and the table moves the distance of the material removed from the bearing blank plus the amount of material removed from the machining tool, thus, the amount remaining after the step of subtracting will be the amount of wear on the machining tool. The distance measured by the gage may be reduced in half to account for material removal from both sides of the bearing.

The quotient may be any value calculated by subtracting one or more measurements regarding the bearing blank from each other to determine the amount of wear on the machining tool. The quotient may be a dimension (e.g., a length, a volume, a width, a circumference). The quotient may be compared to a calculated dimension value for the machining tool, an estimated dimension value for the machining tool, or both.

The comparison between a gage measurement and a reference measurement may result in the device prompting for user assistance. The device if off by 5 percent or more, 10 percent or more, 15 percent or more or 20 percent or of the total dimension value, of the estimated and/or calculated dimension removed, or both more may prompt the user to review the process to see if the device is working properly. The comparison may indicate that the machining tool is harder, softer, the wrong tool, not adequately lubricated during machining, using the wrong lubricant, or a combination thereof. During the step of prompting a user to review the device the device may prompt review of the coolant volume, machining tool hardness, bearing blank quality, or a combination thereof.

The device may prompt a user to input one or more process variables during a set-up, a changeover, during processing, after calibration, after a machine stoppage or a combination thereof so that the gage measurements may be compared to a reference measurement to reduce scrap, increase quality, reduce process variation from part to part, or a combination thereof. Examples, of some process variables that may be input by a user, automatically populated, cross-referenced with a product line, or a combination there are acceptable variation, maximum tolerance, minimum tolerance, stage where a measurement is performed, stage each step is performed, standard deviation, sample size to calculate the average reference measurement, dimensions, or a combination thereof.

The device may be used in a method of measuring bearing blanks for machining. The method may use one or more of the following steps in virtually any order. The one or more bearing blanks may be moved into a movable table. The one or more bearing blanks may be sequentially moved into the movable table. The table may be moved. The table may be moved in the Z-direction, the Y-direction, the X-direction, or a combination thereof. The actual table position may be measured. The actual table position may be measured by measuring the distance between the machining tool and the bearing blank, an upper portion of the movable table, or both. A reference measurement may be determined by measuring the distance traveled of the movable table versus a standard measurement point, a point of contact with the machining tool, a reference point, or a combination thereof. The movable table may move to a standard distance and the machining tool may be moved to a standard distance from the bearing blank and the actual table position of the movable table relative to the machining tool may be measured and compared to the gage measurement to determine the dimensions of the bearing blank. The actual table position, dimensions of the bearing blank, or both may be measured and/or determined by the gage, before any machining begins on the bearing blank, after machining has begun, during machining, or a combination thereof. A baseline of measurements may be taken by the movable table gage, a user, or both and provided to the device so that an average table position may be compared to a current table position to determine whether the part is within specification or out of specification. The method discussed herein may be repeated in each stage discussed herein. For example, the measuring and comparing steps may be repeated 2 or more time or preferably 3 or more times.

The device may accept bearing blanks and/or machine bearing blanks so that the bearing blanks are within specification (i.e., are within about ±20 percent or less, about ±10 percent or less, or about ±5 percent of the average table position, the gage position, or both). The device may reject bearing blanks that are outside of specification. The device may be stopped if a bearing blank is outside of the average table position. The device may be used to measure the inner diameter, outer diameter, thickness, height, or a combination thereof of the bearing blanks. The rejected bearing blanks outside of specification, but close to specification (i.e., within about 40 percent to about 20 percent of the average table position or preferably within about 30 percent to about 20 percent of the average table position) may be sent to a rework pile and rejected bearing blanks outside of specification, but not close to specification (i.e., about 40 percent or more) may be rejected and/or scrapped. The gage measurement, the reference measurement, or both may be taken at one or more stages during the grinding process. For example, grinding may have a rough, a fine, an extra fine, a polish, a smoothing, or a combination thereof stages that are performed during the grinding process and the gage measurement the reference measurement, or both may be measured during one or more of these stages. Preferably, the comparison between the gage measurement and the reference measurement is performed at a stage where the part may be reworked and used. It is contemplated that the reference measurement may be used to indicate the relative dimensions of the bearing blank and that once the reference measurement approaches the desired dimension of a given stage the gage may be moved into contact with the bearing blank so that the gage may measure the dimension. Preferably, the gage may be free of contact with the bearing blank for 30 percent or more, preferably 40 percent or more, or more preferably 50 percent or more of a grinding stage. The gage may be free of contact with the bearing blank for 95 percent or less, 90 percent or less, 80 percent or less, or 70 percent or less of a machining cycle.

Figure 1:
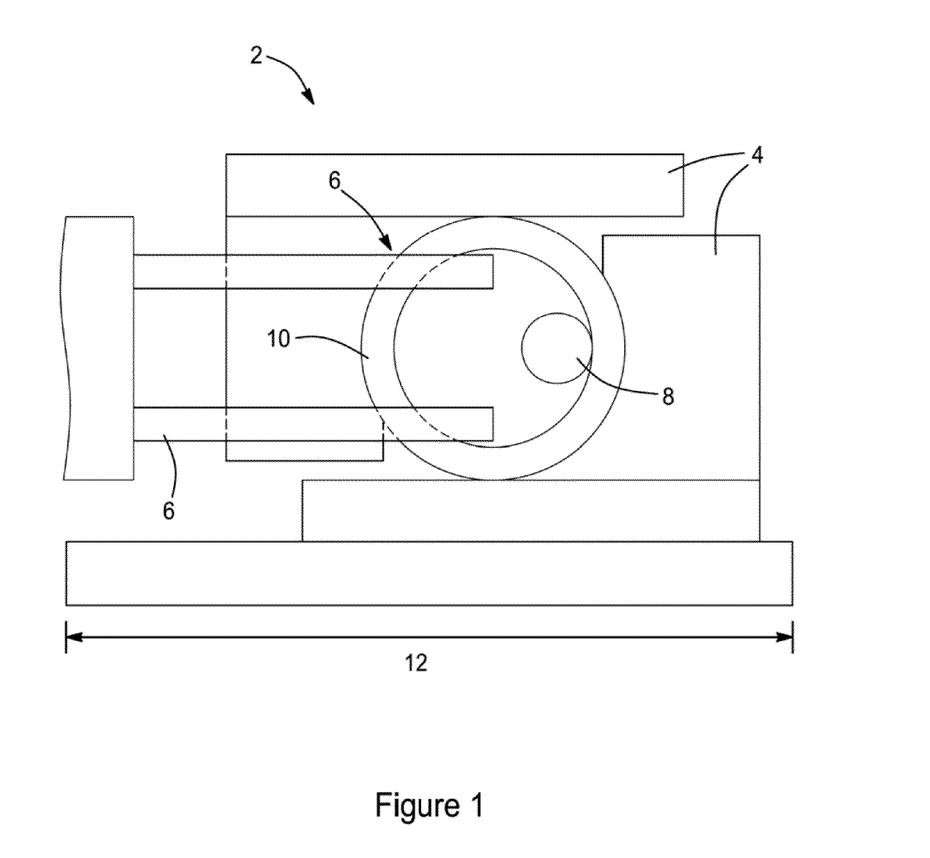
FIG. 1 is a cross-sectional view of one possible grinding machine.

FIG. 1 illustrates a grinding machine 2. The grinding machine 2 includes a two part movable table 4 for holding a bearing blank 10. A gage 6 is in contact with an inner diameter of the bearing blank 10 so that the inner diameter is measured. A grinding wheel 8 is in contact with and grinding an inner diameter of the bearing blank 10. The movable table moves along the axis 12 so that the grinding wheel 8 remains in contact with the bearing blank 10 as material is removed.

Figure 2:
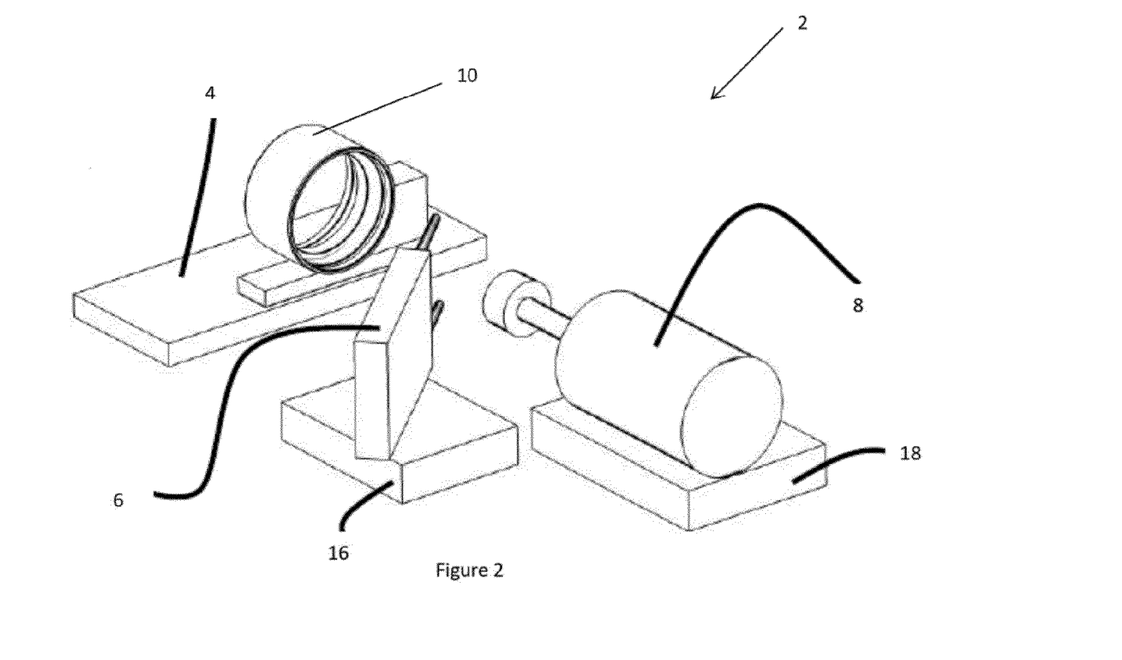
FIG. 2 illustrates a perspective view of a grinding machine and related parts.

FIG. 2 illustrates a perspective view of the grinding machine 2 and its components spaced apart. The movable table 4 is holding a bearing blank 10. The gage 6 is affixed to a movable gage table 16 so that the gage 6 is movable towards and away from the bearing blank 10. The grinding wheel 8 is affixed to a movable grinding wheel table 18 so that the grinding wheel 8 is movable towards and away from the bearing blank.

Figure 2A:
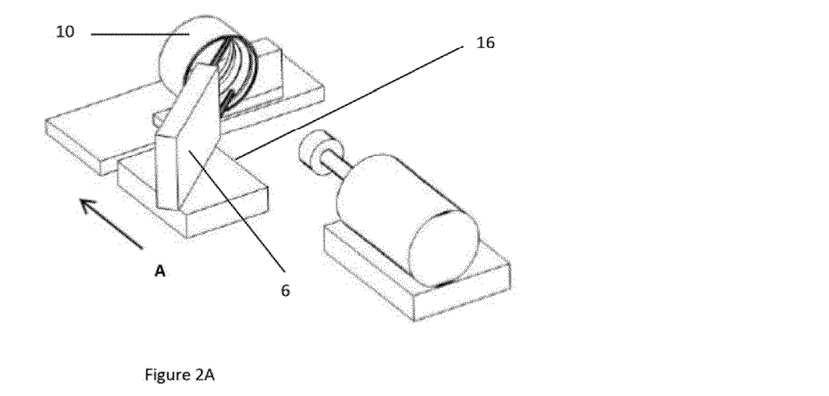
FIGS. 2A-2C illustrate a sequence of grinding a bearing blank.
Figure 2B:
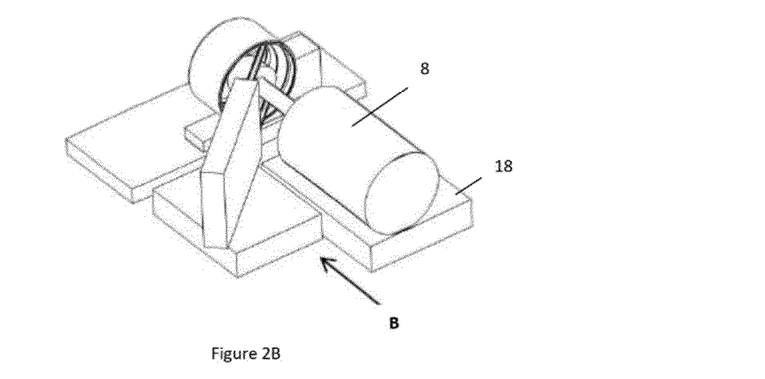
Figure 2C:
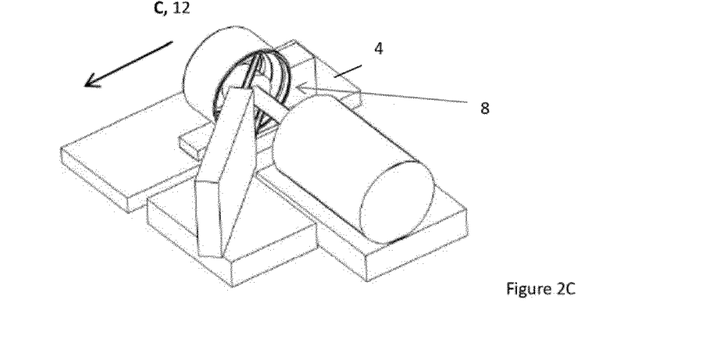

FIG. 2A illustrates a gage 6 moving in the direction (A) on the movable gage table 16 so that the gage 6 contacts a bearing blank 10 and measures an inner diameter of the bearing blank 10. FIG. 2B illustrates a grinding wheel 8 moving in the direction (B) on the movable grinding wheel table 18 so that the grinding wheel 8 contacts a bearing blank 10 for changing the inner diameter of the bearing blank 10. FIG. 2C illustrates the movable table 4 moving in the direction (C) along the axis 12 so that the bearing blank 10 is moved into contact with the grinding wheel 8 so that the inner diameter of the bearing blank 10 is reduced.

Figure 3A:
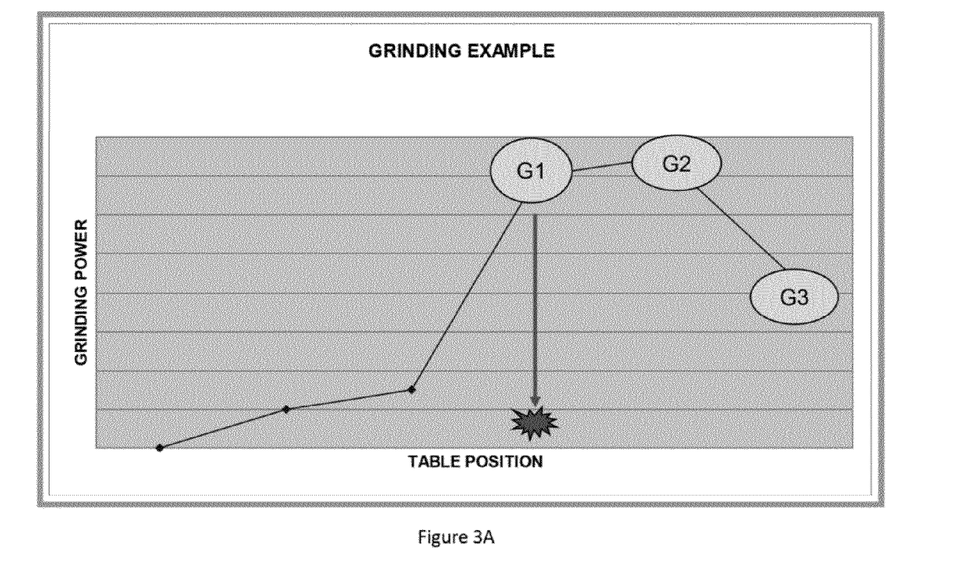
FIG. 3A illustrates one possible example of the table measurements taking during processing.

FIG. 3A illustrates one example of a grinding cycle having grinding steps G1, G2, and G3. The table position is measured when the gage indicates that the bearing blank is approaching the end of the G1 step so that the dimensions are ascertained and the grinding power is increased if the table position and the measured dimensions are within the acceptable range.

Figure 3B:
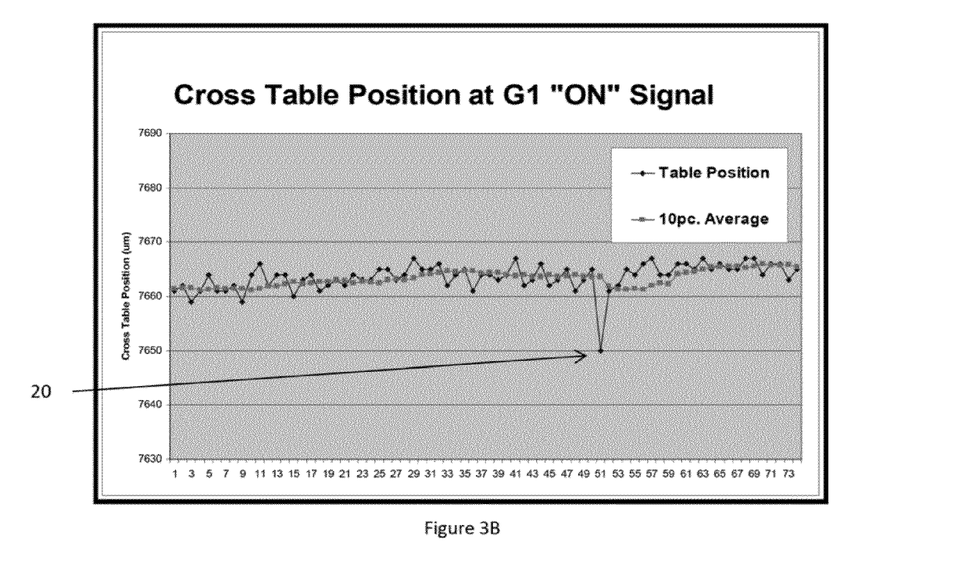
FIG. 3B illustrates a table tracking the table position during grinding and the rolling average of the table positions.

FIG. 3B illustrates an example of the table position at G1 from FIG. 2A being input into a table so that a 10 piece rolling average is obtained that is compared to the gage measurement and the current table measurement. As illustrated the table includes an out of specification measurement 20. When an out of specification measurement 20 is indicated the machine automatically shuts down for service.

Figure 4:
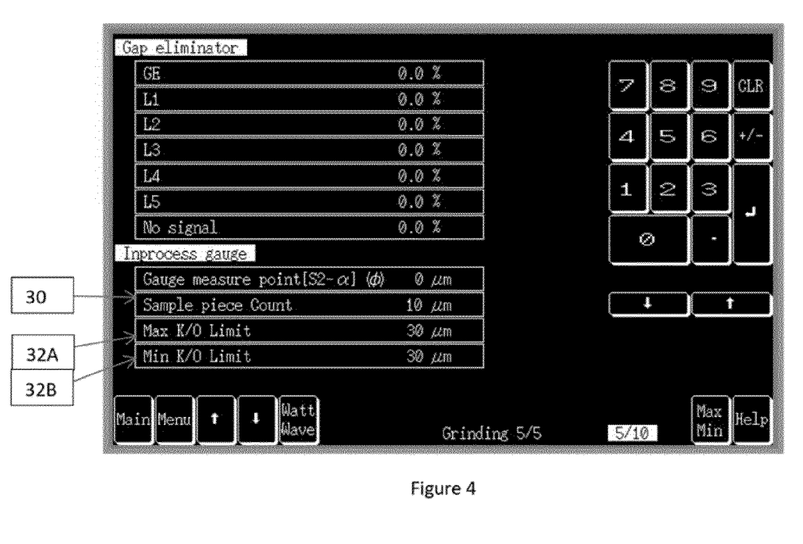
FIG. 4 illustrates a table of in process variables that maybe adjusted during grinding.

FIG. 4 illustrates some process variables that the system prompts a user to input when a product change is made. The system requests the number of table measurements to calculate the average 30 and an upper tolerance 32A and lower tolerance 32B for the table position. As illustrated these steps are indicated for grinding step 5 of 5 and are prompted for each grinding step.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term may herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A method comprising:
   a. providing a device comprising:
      i. a movable table having a movement gage;
      ii. a gage for measuring a dimension of one or more bearing blanks; and
      iii a machining tool for machining the one or more bearing blanks;
   b. supplying the one or more bearing blanks into the device;
   c. moving the one or more bearing blanks to a table grinding position;
   d. machining the one or more bearing blanks with the machining tool;
   e. estimating and/or calculating a volume removed from the machining tool during the step of machining;
   f. measuring a distance moved by the movable table so hat a reference measurement is provided;
   g. measuring a change in the dimension of the one or more bearing blanks using the gage; and
   h. subtracting the distance moved by the movable table in step (f) from the change in the dimension of the one or more bearing blanks; and
   i. comparing a quotient of step (h) to the volume of step (e) so that the volume removed from the machining tool is monitored during machining.

2. The method of claim 1, wherein the step of measuring using the gage is performed before the one or more bearing blanks are machined, during machining, during a grinding stage, or a combination thereof.

3. The method of claim 1, wherein the step of measuring the distance moved by the movable table is continuously measured.

4. The method of claim 1, wherein a predetermined number of the reference measurements are averaged determining an average reference measurement before the step of comparing.

5. The method of claim 4, wherein the average reference measurement is the distance used in the step of subtracting.

6. The method of claim 4, wherein the predetermined number of the reference measurements are at least 10 reference measurements, but less than 50 reference measurements.

7. The method of claim 1, wherein the method further comprises inputting one or more process variable, and wherein the one or more process variables are number of pieces to calculate an average reference measurement, a maximum tolerance, a minimum tolerance, stage measurement is taken, stage each step is performed, or a combination thereof.

8. The method of claim 7, wherein the method includes a step of prompting a user to input the one or more process variables when the device indicates a series of rejected, false kick-outs, or both.

9. The method of claim 8, wherein the step of prompting occurs during a changeover, during a set-up, after calibration, after a machine stoppage, or a combination thereof.

10. The method of claim 8, wherein the step of prompting is performed by a non transitory program.

11. The method of claim 1, wherein the one or more bearing blanks are rejected if the bearing blank measurement is outside of an average reference measurement.

12. The method of claim 1, wherein the device is stopped if the one or more bearing blanks are outside an average reference measurement.

13. The method of claim 1, wherein an inside diameter, an outside diameter, height, width, thickness, or a combination thereof of the one or more bearing blanks are measured.

14. The method of claim 1, wherein the one or more bearing blanks are remanufactured if the one or more bearing blanks measure outside of the average reference measurement.

15. The method of claim 1, wherein the gage is moved into a measuring position based upon a reference measurement of the movable table.

16. The method of claim 15, wherein the gage is moved into the measuring position when the reference measurement of the movable table indicates that 50 percent or more of the machining has been completed.

17. The method of claim 1, wherein the method is repeated in each grinding stage so that dimensions of completed parts are substantially uniform.

18. The method of claim 1, wherein the device includes a computer, a user interface, or both.

19. The method of claim 1, wherein a softer and/or a harder machining tool will indicated a larger change in the volume removed from the machining tool and will trigger an indicator so that a user will check the device.

20. The method of claim 19, wherein the larger change in the volume removed will trigger a review of coolant volume, machining tool hardness, part quality, or a combination thereof.

\* \* \* \* \*

UNITED STATES PATENT AND TRADEMARK OFFICE
CERTIFICATE OF CORRECTION

PATENT NO. : 9,180,559 B2  
APPLICATION NO. : 13/951919  
DATED : November 10, 2015  
INVENTOR(S) : Jose Cabral It is certified that error appears in the above-identified patent and that said Letters Patent is hereby corrected as shown below:

In the Claims:

Column 10, Line 12, "hat" should be "that"

Column 10, Line 40, "variable" should be "variables"

Column 11, Line 14, "indicated" should be "indicate"

Signed and Sealed this  
Ninth Day of August, 2016

Michelle K. Lee  
*Director of the United States Patent and Trademark Office*